US012726234B2

(12) United States Patent
Butt

(10) Patent No.: US 12,726,234 B2
(45) Date of Patent: Sep. 1, 2026

(54) RANGE EXTENSION OF AMBIENT INTERNET OF THINGS DEVICES

(71) Applicant: Nokia Technologies Oy, Espoo (FI)

(72) Inventor: Muhammad Majid Butt, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/809,759

(22) Filed: Aug. 20, 2024

(65) Prior Publication Data

US 2025/0080169 A1 Mar. 6, 2025

(30) Foreign Application Priority Data

Sep. 1, 2023 (FI) ..................................... 20235977

(51) Int. Cl.
*H04B 5/79* (2024.01)
*H02J 50/00* (2016.01)
*H04W 76/18* (2018.01)
*H04W 76/28* (2018.01)

(52) U.S. Cl.
CPC .............. *H04B 5/79* (2024.01); *H02J 50/001* (2020.01); *H04W 76/18* (2018.02); *H04W 76/28* (2018.02)

(58) Field of Classification Search
CPC .. H04B 5/79; H04B 7/22; H02J 50/001; H02J 50/20; H04W 76/18; H04W 76/28; H04W 4/20; H04W 8/02; H04W 8/22; H04W 72/0473; H04L 67/12
See application file for complete search history.

(56) References Cited

U.S. PATENT DOCUMENTS 8,988,197 B2 3/2015 Wild et al.
2011/0285603 A1 * 11/2011 Skarp .................. H04B 1/0458 343/860
2022/0021240 A1 1/2022 Li et al.
(Continued)

FOREIGN PATENT DOCUMENTS

WO 2022/132121 A1 6/2022

OTHER PUBLICATIONS

"New SID: Study on Ambient IoT", 3GPP TSG RAN#97e, RP-222685, Agenda: 9.1, Huawei, Sep. 12-16, 2022, 5 pages.
(Continued)

*Primary Examiner* — Chieh M Fan
(74) *Attorney, Agent, or Firm* — Nokia Technologies Oy

(57) ABSTRACT

Method, apparatus, and device for communicating with an extended range. The apparatus is a network apparatus communicating an ambient internet of things device having an energy storage and capability to transmitting data by backscattering a radio transmission. The apparatus detects that the device has failed to transfer data by the backscattering and responsively sends to the device a first radio transmission having instructions to decrease a radio reflection coefficient to increase wireless energy harvesting. The device decreases the radio reflection coefficient accordingly. The apparatus further sends to the device a second radio transmission having instructions to increase the radio reflection coefficient to decrease wireless energy harvesting. The device increases the radio reflection coefficient accordingly. The apparatus attempts to detect that the device has succeeded to transfer data by the backscattering.

2 Claims, 7 Drawing Sheets

(56) References Cited

U.S. PATENT DOCUMENTS

2023/0254886 A1 8/2023 Gupta et al.
2025/0266722 A1* 8/2025 Liang .................... H02J 50/001

OTHER PUBLICATIONS

"3rd Generation Partnership Project; Technical Specification Group Radio Access Network; Study on Ambient IoT (Internet of Things) in RAN (Release 18)", 3GPP TR 38.848, V0.1.0, Mar. 2023, pp. 1-17.
Huynh et al., "Ambient Backscatter Communications: A Contemporary Survey", IEEE Communications Surveys & Tutorials, vol. 20, No. 04, Fourthquarter, 2018, pp. 2889-2922.
Muratkar et al., "Effect of Dynamic Reflection Coefficient on Backscatter System in Time-Selective Scenario", IEEE Journal of Radio Frequency Identification, vol. 07, 2023, pp. 45-49.
"Ambient IoT deployment feasibilities", 33GPP TSG-RAN #100, RP-230861, Agenda: 9.2.2, Nokia, Jun. 12-14, 2023, 11 pages.
Finnish Provisional Application No. 20235978, "Range Extension of Ambient Internet of Things Devices", filed on Sep. 1, 2023, pp. 1-23.
Finnish Provisional Application No. 20235975, "Range Extension of Ambient Internet of Things Devices", filed on Sep. 1, 2023, pp. 1-35.
Office action received for corresponding Finnish Patent Application No. 20235977, dated Feb. 1, 2024, 11 pages.
"3rd Generation Partnership Project; Technical Specification Group Services and System Aspects; Study on Ambient power-enabled Internet of Things (Release 19)", 3GPP TR 22.840, V1.2.0, May 2023, pp. 1-121.

* cited by examiner 110
110
120
110
130
110
110
110
120
Energy
Backscattering 220
210
Channel coding and modulation block
Za
210'
230
Z1
Z2
Z3
Z4
Za
240
250
260
270

300
310
320
330
340
342
344
346
348
350
MEM
Work
N/V
PGM
Data
I/O
U/I
PROCESSOR
SIM slot/eSIM module 400
450
430
410
420
440
442
444
446
448
MEM
Work
N/V
PGM
Data
Energy storage
Radio circuitry (energy harvester)
Control circuitry

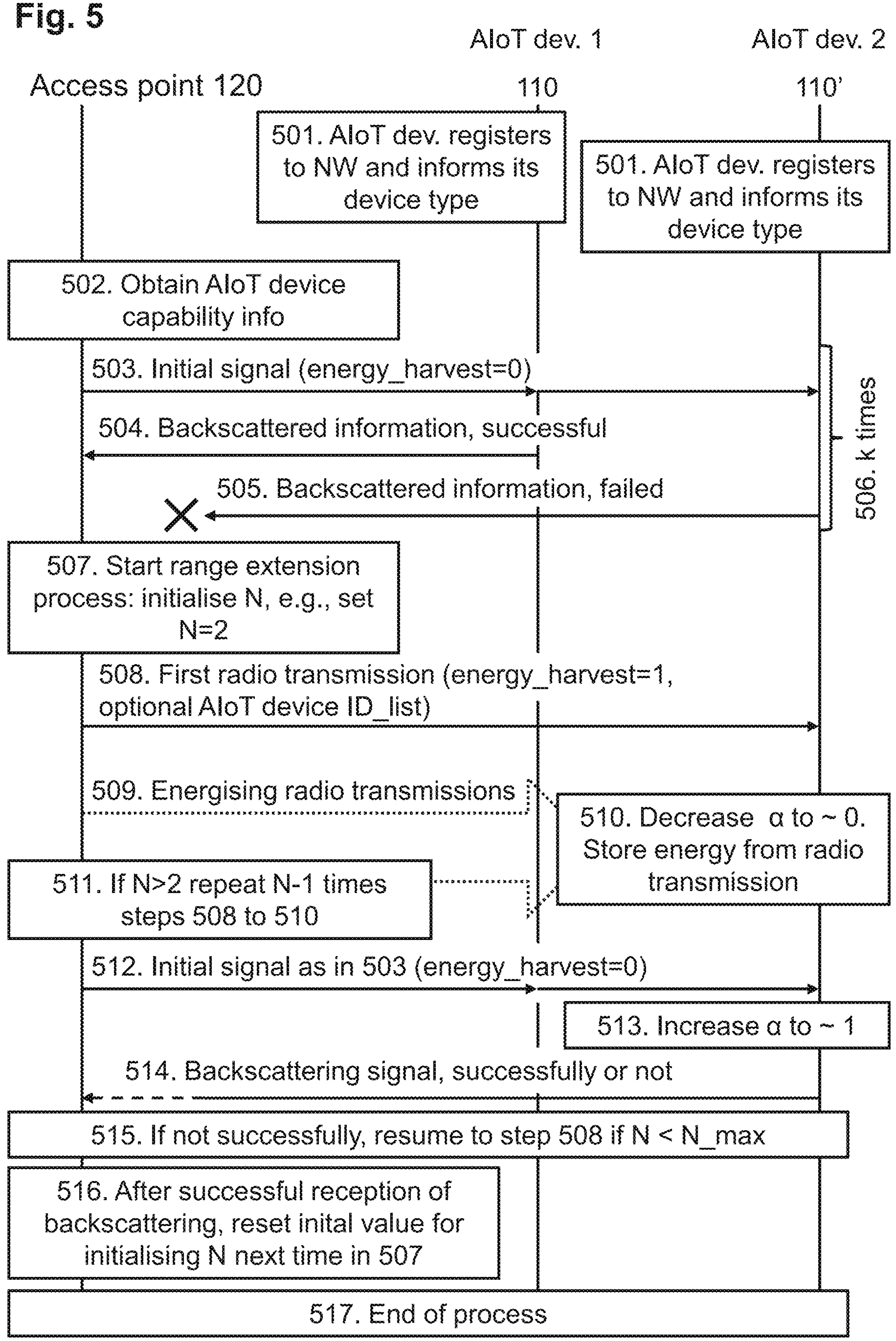
Fig. 5
Access point 120
AIoT dev. 1
110
AIoT dev. 2
110'
501. AIoT dev. registers to NW and informs its device type
501. AIoT dev. registers to NW and informs its device type
502. Obtain AIoT device capability info
503. Initial signal (energy_harvest=0)
504. Backscattered information, successful
505. Backscattered information, failed
506. k times
507. Start range extension process: initialise N, e.g., set N=2
508. First radio transmission (energy_harvest=1, optional AIoT device ID_list)
509. Energising radio transmissions
510. Decrease α to ~ 0. Store energy from radio transmission
511. If N>2 repeat N-1 times steps 508 to 510
512. Initial signal as in 503 (energy_harvest=0)
513. Increase α to ~ 1
514. Backscattering signal, successfully or not
515. If not successfully, resume to step 508 if N < N_max
516. After successful reception of backscattering, reset inital value for initialising N next time in 507
517. End of process Initialise counter N
601
Cause decreasing α to ~ 0
602
Cause transmission of N energising radio transmissions
603
Cause increasing α to ~ 1
604
Backscattering successful?
605
Yes
No
N < N_max
606
No
Yes
Increment N by an increment
607
End
608

Fig. 7a

701. Causing sending an initial transmission to a device that is an AIoT device with an energy storage and capable of transmitting data by backscattering a radio transmission.

702. Causing detecting that the device has failed to transfer data by the backscattering.

703. Based on the detecting, causing sending, to the device, a first radio transmission comprising instructions to decrease a radio reflection coefficient to increase wireless energy harvesting.

704. Causing sending to the device, a second radio transmission comprising instructions to increase the radio reflection coefficient to decrease wireless energy harvesting.

705. Causing attempting to detect that the device has succeeded to transfer data by the backscattering.

706. Repeating the causing of the sending of the first radio transmission comprising instructions to decrease the radio reflection coefficient and the sending of the second radio transmission comprising instructions to increase the radio reflection coefficient until detecting that the device has succeeded to transfer data by the backscattering or until detecting that a maximum number of repetitions has been performed.

707. The detecting that the device has succeeded to transfer data by the backscattering comprising detecting reception of data from the device after sending a radio transmission to the device.

Fig. 7b

708. The detecting that the device has succeeded to transfer data by the backscattering comprising receiving information from an ambient internet of things access point that the ambient internet of things access point has succeeded to receive data from the device after the apparatus has sent a radio transmission to the device.

709. Determining, after detecting that the device has succeeded to transfer data by the backscattering, for a subsequent communication attempt with the device, instructions to decrease the radio reflection coefficient factor to increase wireless energy harvesting based on previous instructions.

710. The detecting that the device has failed to transfer data by the backscattering comprising detecting a failure of receiving data from the device during the sending of the initial radio transmission to the device.

711. The detecting that the device has failed to transfer data by the backscattering comprising receiving information from an ambient internet of things access point that the ambient internet of things access point has failed to receive data from the device during the sending of the initial radio transmission to the device.

712. Causing transmitting to the device an energising radio transmission intended for energy harvesting with a decreased or low reflection coefficient after the sending of the first radio transmission comprising the instructions to decrease the radio reflection coefficient.

713. The energising radio transmission intended for energy harvesting with the decreased or low radio reflection coefficient being one continuous transmission.

Fig. 8

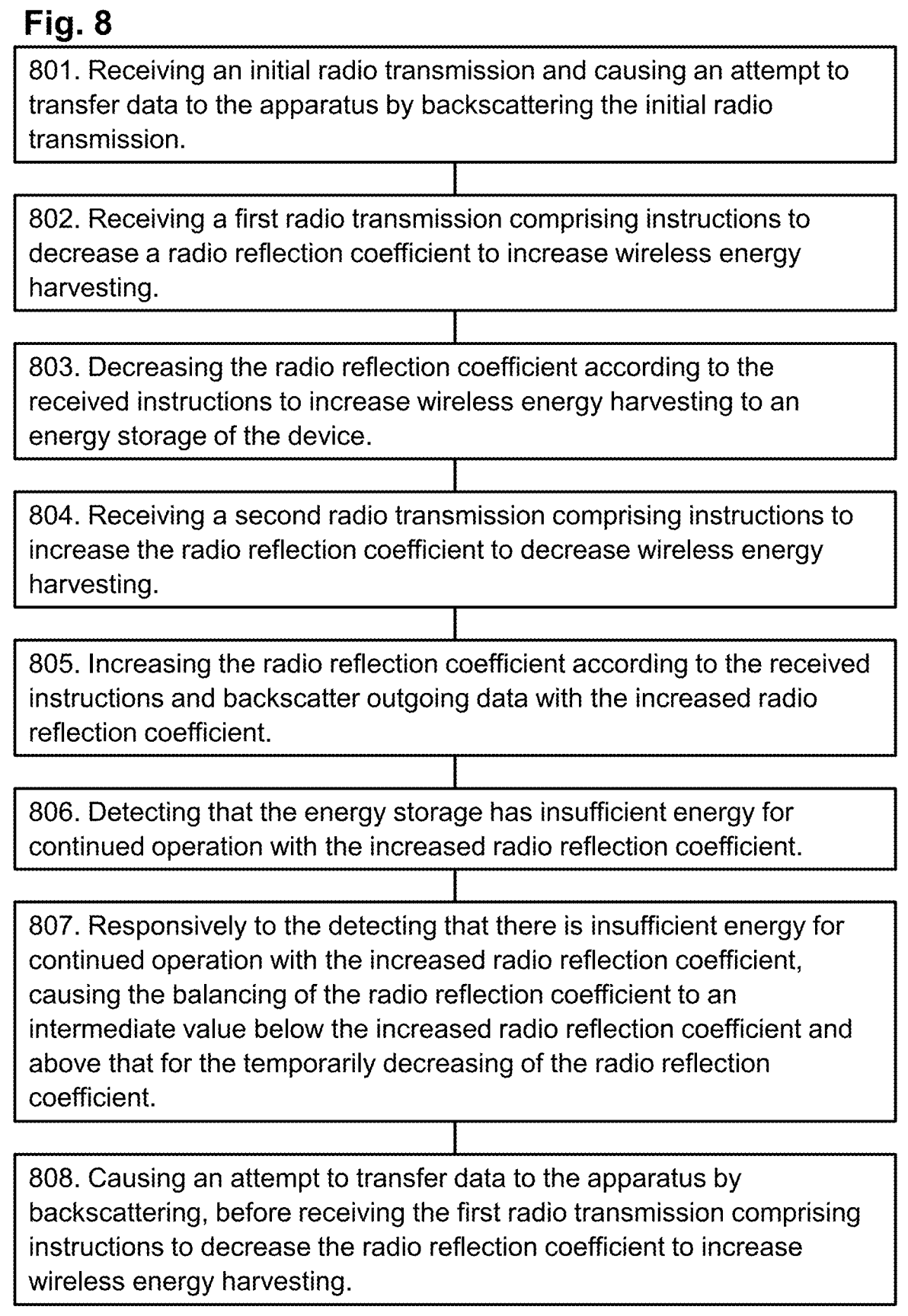

801. Receiving an initial radio transmission and causing an attempt to transfer data to the apparatus by backscattering the initial radio transmission.

802. Receiving a first radio transmission comprising instructions to decrease a radio reflection coefficient to increase wireless energy harvesting.

803. Decreasing the radio reflection coefficient according to the received instructions to increase wireless energy harvesting to an energy storage of the device.

804. Receiving a second radio transmission comprising instructions to increase the radio reflection coefficient to decrease wireless energy harvesting.

805. Increasing the radio reflection coefficient according to the received instructions and backscatter outgoing data with the increased radio reflection coefficient.

806. Detecting that the energy storage has insufficient energy for continued operation with the increased radio reflection coefficient.

807. Responsively to the detecting that there is insufficient energy for continued operation with the increased radio reflection coefficient, causing the balancing of the radio reflection coefficient to an intermediate value below the increased radio reflection coefficient and above that for the temporarily decreasing of the radio reflection coefficient.

808. Causing an attempt to transfer data to the apparatus by backscattering, before receiving the first radio transmission comprising instructions to decrease the radio reflection coefficient to increase wireless energy harvesting.

RANGE EXTENSION OF AMBIENT INTERNET OF THINGS DEVICES

RELATED APPLICATION

This application claims priority from Finland Application No. 20235977, filed on 1, Sep. 2023, which is incorporated herein by reference in its entirety.

TECHNICAL FIELD

Various example embodiments relate to range extension of ambient internet of things devices.

BACKGROUND

This section illustrates useful background information without admission of any technique described herein representative of the state of the art.

Ambient Internet of Things (AIoT) devices come in a variety of different types including those that use backscattering to reflect desired parts of an energising radio signal to an AIoT access point and comprise a chargeable energy storage such as a battery or capacitor. The energy storage may enable communication with a greater range in case that the AIoT device can use the stored energy for operating its processing equipment (and may include minimum energy to activate backscattering transmission) and reflect as much radio energy as possible to the access point, also called reader. However, in such a case, the energy storage needs to be charged in advance. Since the AIoT devices might not be conveniently chargeable by anyone and charging connectors incur expense and some structural requirements, separate charging is not always possible. On the other hand, without an energy storage, the AIoT device must continuously receive at least as much energy as needed to run its processing equipment and reflect enough radio energy to the access point. Hence, effective range of a battery-less AIoT device may significantly suffer. Moreover, the radio conditions are also prone to fluctuate through a number of reasons. Even if the AIoT could sufficiently operate at a given range for a portion of required time, loss of connectivity and perhaps entire operating power of processing equipment of the AIoT may prevent desired operation of the AIoT device.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first example aspect, there is provided an apparatus comprising at least one processor; and at least one memory storing instructions that, when executed by the at least one processor, cause the apparatus at least to cause sending an initial radio transmission to a device, wherein the device is an ambient internet of things device with an energy storage and wherein the device is capable of transmitting data by backscattering a radio transmission; cause detecting that the device has failed to transfer data by the backscattering; and based on the detecting, cause sending, to the device, a first radio transmission comprising instructions to decrease a radio reflection coefficient to increase wireless energy harvesting; cause sending to the device, a second radio transmission comprising instructions to increase the radio reflection coefficient to decrease wireless energy harvesting; and cause attempting to detect that the device has succeeded to transfer data by the backscattering.

According to a second example aspect, there is provided an ambient internet of things device comprising an energy storage, at least one processor; and at least one memory storing instructions that, when executed by the at least one processor, cause the device to receive an initial radio transmission and cause an attempt to transfer data to an apparatus by backscattering the initial radio transmission; receive a first radio transmission comprising instructions to decrease a radio reflection coefficient to increase wireless energy harvesting; decrease the radio reflection coefficient according to the received instructions to increase wireless energy harvesting to the energy storage; receive a second radio transmission comprising instructions to increase the radio reflection coefficient to decrease wireless energy harvesting; and increase the radio reflection coefficient according to the received instructions and backscatter outgoing data with the increased radio reflection coefficient.

According to a third example aspect, there is provided a system comprising the apparatus of the first example aspect and a device of the second example aspect.

According to a fourth example aspect, there is provided a method comprising causing, by a network apparatus, sending an initial transmission to a device, wherein the device is an ambient internet of things device with an energy storage and wherein the device is capable of transmitting data by backscattering a radio transmission; causing detecting, by the network apparatus, that the device has failed to transfer data by the backscattering; causing by the network apparatus, based on the detecting, sending to the device a first radio transmission comprising instructions to decrease a radio reflection coefficient to increase wireless energy harvesting; causing, by the network apparatus, sending to the device a second radio transmission comprising instructions to increase the radio reflection coefficient to decrease wireless energy harvesting; and causing attempting, by the network apparatus, to detect that the device has succeeded to transfer data by the backscattering.

According to a fifth example aspect, there is provided a method comprising, by a device that is an ambient internet of things device, receiving an initial radio transmission and causing an attempt to transfer data to an apparatus by backscattering the initial radio transmission; receiving, by the device, a first radio transmission comprising instructions to decrease a radio reflection coefficient to increase wireless energy harvesting; decreasing, by the device, the radio reflection coefficient according to the received instructions to increase wireless energy harvesting to an energy storage of the device; receiving, by the device, a second radio transmission comprising instructions to increase the radio reflection coefficient to decrease wireless energy harvesting; increasing, by the device, the radio reflection coefficient according to the received instructions and backscattering, by the device, outgoing data with the increased radio reflection coefficient.

According to a sixth example aspect, there is provided a computer program comprising computer executable program instructions configured to cause performing any method of the third or fourth example aspect.

The computer program may be stored in a computer readable memory medium. The memory medium may comprise a digital data storage such as a data disc or diskette, optical storage, magnetic storage, holographic storage, opto-magnetic storage, phase-change memory, resistive random-access memory, magnetic random-access memory, solidelectrolyte memory, ferroelectric random-access memory, organic memory, or polymer memory. The memory medium may be formed into a device without other substantial functions than storing memory or it may be formed as part of a device with other functions, including but not limited to a memory of a computer, a chip set, and a sub assembly of an electronic device.

According to a seventh example aspect, there is provided an apparatus comprising at least one processor and at least one memory storing instructions that, when executed by the processor, cause the apparatus to perform the method of the third or fourth example aspect.

According to an eighth example aspect, there is provided an apparatus comprising means for performing the method of the third example aspect.

According to a ninth example aspect, there is provided a device comprising means for performing the method of the fourth example aspect.

According to a example aspect, there is provided an apparatus comprising

- a first circuitry configured to cause sending an initial transmission to a device, wherein the device is an ambient internet of things device with an energy storage and wherein the device is capable of transmitting data by backscattering a radio transmission;
- a second circuitry configured to cause detecting that the device has failed to transfer data by the backscattering;
- a third circuitry configured to cause, based on the detecting, sending to the device a first radio transmission comprising instructions to decrease a radio reflection coefficient to increase wireless energy harvesting;
- a fourth circuitry configured to cause sending to the device a second radio transmission comprising instructions to increase the radio reflection coefficient to decrease wireless energy harvesting; and
- a fifth circuitry configured to cause attempting to detect that the device has succeeded to transfer data by the backscattering.

According to a tenth example aspect, there is provided a device comprising

- a sixth circuitry configured to perform receiving an initial radio transmission and causing an attempt to transfer data to an apparatus by backscattering the initial radio transmission;
- a seventh circuitry configured to perform receiving a first radio transmission comprising instructions to decrease a radio reflection coefficient to increase wireless energy harvesting;
- an eighth circuitry configured to perform decreasing the radio reflection coefficient according to the received instructions to increase wireless energy harvesting to an energy storage of the device;
- a ninth circuitry configured to perform receiving a second radio transmission comprising instructions to increase the radio reflection coefficient to decrease wireless energy harvesting; and
- a tenth circuitry configured to perform increasing the radio reflection coefficient according to the received instructions and backscattering outgoing data with the increased radio reflection coefficient.

Different non-binding example aspects and embodiments have been illustrated in the foregoing. The embodiments in the foregoing are used merely to explain selected aspects or steps that may be utilized in implementations. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments, reference is now made to the following descriptions taken in connection with the accompanying drawings in which:

FIG. 5 shows a simplified signalling chart of a process of an example embodiment;

FIGS. 7*a* and 7*b* show a simplified flow chart illustrating various features of different example embodiments; and FIG. 8 shows a simplified flow chart illustrating various features of different further example embodiments.

DETAILED DESCRIPTION

An example embodiment and its potential advantages are understood by referring to FIGS. 1 through 8 of the drawings. In this document, like reference signs denote like parts or steps.

Figure 1:
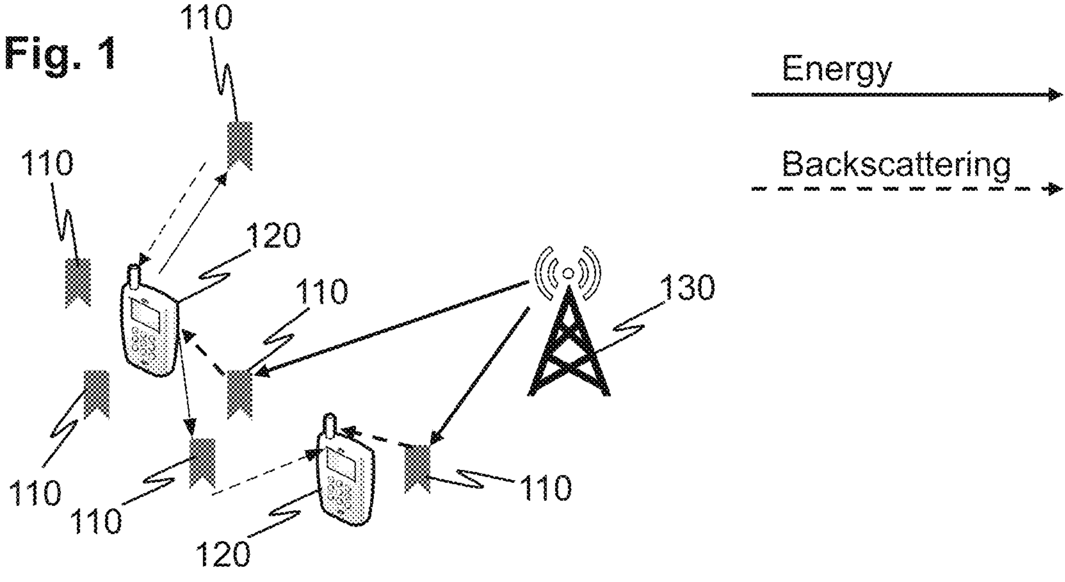
FIG. 1 shows an architectural drawing of a system of an example embodiment.

FIG. 1 shows an architectural drawing of a system. In FIG. 1, a number of ambient internet of things devices 110, or devices in short, reside in some environment. These devices may be standalone parts or fixed or embedded to various goods or items, such as parcels, vehicles, household appliances, mobile phones, generally anything. In comparison to simple radio frequency identifier (RFID) or near field communication (NFC) devices, the ambient IoT, AIoT, devices may be capable of co-operating with modern 3GPP cellular networks and covered by specifications of new 3GPP standards. For example, the AIoT device may be referred to as a tag.

FIG. 1 further shows a number of compatible network apparatuses including monostatic or bistatic access points 120, and an illuminator 130 configured to illuminate devices with energising radio signals without necessarily reading any radio signals communicated by the devices. The illuminator may be, for example, a network node, such as a gNB. The access points may include, for example, user equipment, UE. In some embodiments, the access point may also act as an illuminator. Thus, UE may act as the illuminator as well. An access point may be configured with monostatic configuration, wherein the same access point is configured to illuminate the AIoT device and read signals backscattered by the AIoT devices. Access points may be configured with bistatic configuration, wherein a first access point or an illuminator is configured to perform the illumination and a second access point configured to read the backscattering signals. FIG. 1 shows an example of an access point configured to operate as a monostatic access point for given devices. In an example embodiment, at least some of the access points 120 are capable of simultaneously operating in the monostatic configuration for a first set of AIoT devices 110 and in the bistatic configuration for a second set of AIoT devices 110 as a reader or as an illuminator. FIG. 1 also shows an example of an access point configured to operate as a bistatic element for other devices.

Figure 2:
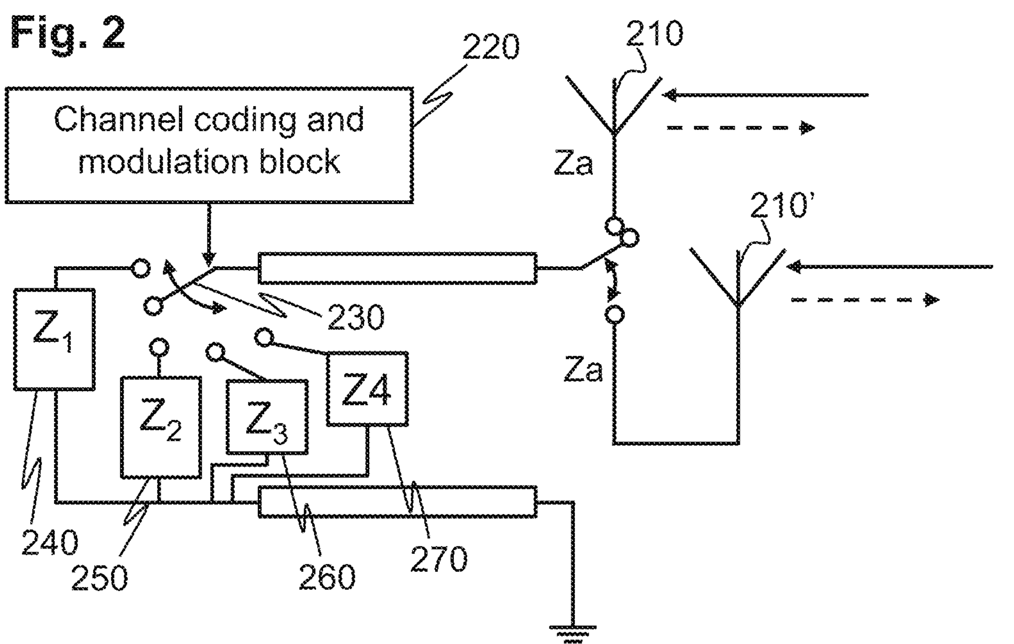
FIG. 2 shows a simplified backscattering circuitry of an example embodiment.

FIG. 2 shows a simplified backscattering circuitry comprised in an AIoT device of an example embodiment. An antenna 210 is provided for receiving a radio transmission and backscattering outgoing data. A channel coding and modulation block 220 controls forming of the backscattering by controlling a switch 230 that is here drawn as being controllable to connect the antenna with one of a plurality of impedances. The plurality of impedances may comprise, for example, a first impedance Z1 240, a second impedance Z2 250, a third impedance Z3 260, and a fourth impedance Z4 270, and possibly further impedances. In at least some embodiments, the backscattering circuitry has exactly three impedances, e.g., Z1 and Z2 and Z3, and the switch 230 is configured to connect the antenna with one of the three impedances. In an example embodiment, the backscattering has exactly two impedances Z1 and Z2. In an example embodiment, the backscattering circuitry is adaptable to operate with two or more different radio reflection coefficients, RC, by selectively connecting to one of a plurality of different antennas. FIG. 2 shows for illustration purpose another antenna 210'. The antennas 210, 210' may differ by their gain in a frequency band used for the backscattering.

In an example embodiment, any of the devices 110, access points 120, and illuminators may be compatible with a 3GPP technical recommendation TR 22.840: Study of Ambient IoT. That recommendation particularly lists following types of Ambient AIoT devices:

- Device A: No energy storage, no independent signal generation or amplification, i.e., backscattering transmission.
- Device B: Energy storage, no independent signal generation or amplification, i.e., backscattering transmission. Use of stored energy can include amplification for reflected signals.
- Device C: Energy storage, independent signal generation, i.e., active RF components for transmission.

Type A and Type B both are passive energy harvesting IoT devices without and with an energy storage, respectively. In a type B device, the energy storage can be used to amplify the signal and extend transmission range. This can be used either by using an amplifier at the device or just dynamically adjusting the reflection coefficient. However, it is observed that adding an amplifier to an AIoT device increases cost and size of the AIoT device.

As mentioned in the foregoing, for a backscattering AIoT device, an illumination signal is used to power the AIoT device as well as to enable backscattering information. The backscattering modulates the radio transmission incident on the AIoT device by reflection with a level of antenna mismatch that is adjusted to alter an RC circuit as illustrated in FIG. 2. Further, such passively communicating devices may perform energy harvesting (EH) from the ambient RF signals for supporting its circuit operation.

Let us consider that how the backscattering circuitry of the AIoT device operates with two impedances, or two different states, for channel coding and modulation with backscattering. In this case, the AIoT device is switched between absorbing and reflecting states by switching between two separate loads such that the absorbing state indicates bit '0' transmission and the reflecting state indicates the bit '1'. A radio reflection coefficient 0 means all energy is absorbed/harvested by the AIoT device while 1 means that energy is reflected by a radio reflection coefficient $0<\alpha<1$. The AIoT device requires $(1-\alpha)$ fraction of the illumination signal power P to power its circuit.

In an example embodiment, the AIoT device is configured to have more than two different states that are needed for channel coding and modulation with backscattering. For example, there may be provided an increased radio reflection coefficient that is closer to one than in normal backscattering. In an example embodiment, the AIoT device is configurable to at least an energy harvesting state in which the radio reflection coefficient is as close to zero as possible; a normal operation state in which the radio reflection coefficient higher but clearly below one to allow sufficient energy harvesting for various circuitries, such as processing and volatile memory circuitries; and a range extending state in which the radio reflection coefficient is as close to zero as possible so as to reach maximum range for outgoing data that is backscattered.

In an example embodiment, the radio reflection coefficient is defined by an equation:

$\alpha_i=(Z_i-Z_a^*)/(Z_i+Z_a)$, where $Z_a$ is antenna impedance, * is a complex-conjugate operator, and i=1, 2, . . . represents switch state. For example, switch state 1 corresponds to a situation that the switch is connected to Z1 and switch state 2 corresponds to a situation that the switch is connected to Z2.

In sake of clarity, it is explicitly noted that the term backscattering refers herein to varying reflection of the radio transmission regardless of that whether the receiver (reader) of backscattered signals is the same apparatus (illuminator) that emitted the radio transmission (monostatic case) or a different apparatus (bistatic case).

Figure 3:
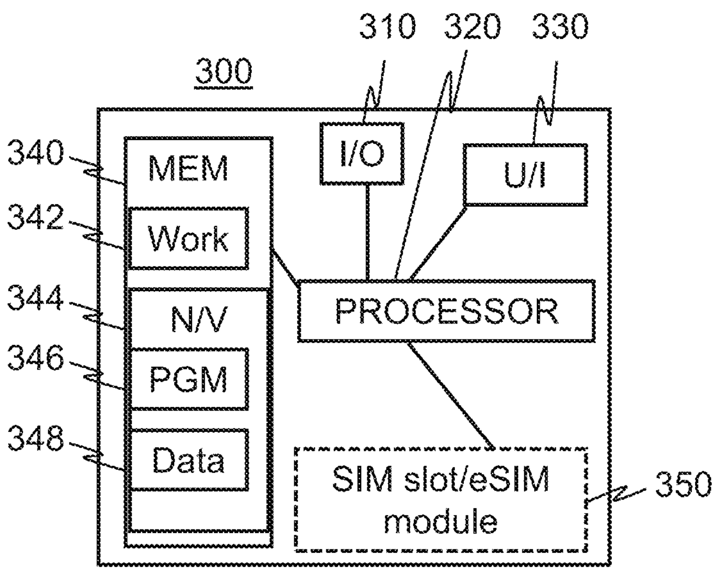
FIG. 3 shows a block diagram of an apparatus of an example embodiment.

FIG. 3 shows a block diagram of an apparatus 300 according to an embodiment of the invention. The apparatus 300 of FIG. 3 may be usable as the access point 120 that can communicate with ambient internet of things devices 110.

The apparatus 300 comprises a memory 340 including a work memory 342 and a non-volatile memory 344 that contains computer program code 346 and data, such as pre-configured rules or configuration information. The apparatus 300 further comprises a processor 320 for controlling the operation of the apparatus 300 using the computer program code 346, a communication unit 310, such as a new radio capable of 5G cellular communications, for communicating with user equipment and cellular network. The communication unit 310 comprises, for example, a local area network (LAN) port; a wireless local area network (WLAN) unit; Bluetooth unit; cellular data communication unit; or satellite data communication unit. The communication unit 310 further comprises a proximity communication circuitry that is capable of communicating with ambient internet of things devices. In an example embodiment, the communication unit 310 further comprises a radio energiser for wirelessly energising devices capable of wirelessly harvesting energy from the radio transmission.

The processor 320 comprises, for example, any one or more of: a master control unit (MCU); a microprocessor; a digital signal processor (DSP); an application specific integrated circuit (ASIC); a field programmable gate array; and a microcontroller. The processor may function as a controller of the apparatus. The apparatus 300 further comprises a user interface 330, comprising, e.g., any one or more of a display, touch screen, button, microphone, speaker, fingerprint reader. In an example embodiment, the apparatus 300 further comprises a programmable subscriber identity module or a slot for receiving a subscriber identity module, 350.

Figure 4:
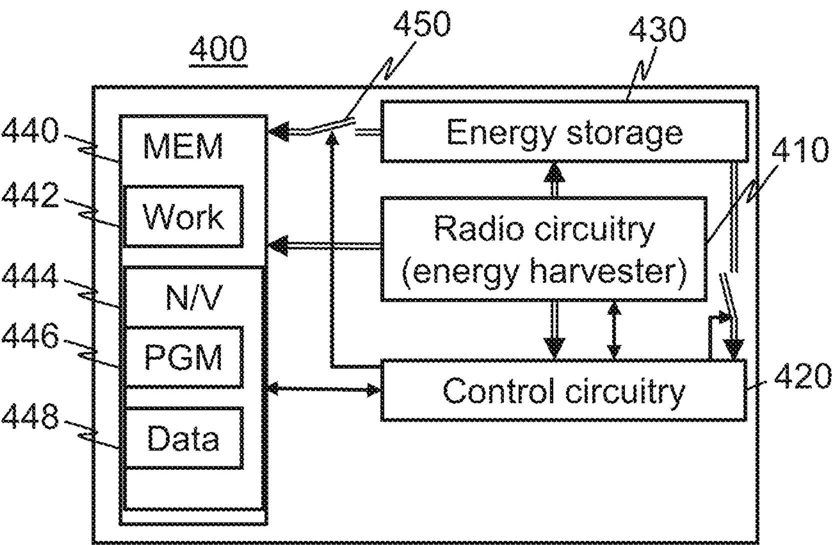
FIG. 4 shows a block diagram of a device of an example embodiment.

FIG. 4 shows a simplified block diagram of a device 400 that may be capable of operating as an ambient internet of things device of an example embodiment. The device 400 may be a type B AIoT device, which comprises an energy storage and which relies on backscattering transmission. For example, the device 400 does not have independent transmission signal generation.

The device 400 comprises a memory 440 including a work memory 442 and a non-volatile memory 444 that contains computer program code 446 and data, such as pre-configured rules or configuration information. The device 400 further comprises a control circuitry 420 for controlling the operation of the device 400 using the computer program code 446. The device further comprises a radio circuitry 410, that is capable of communicating with backscattering based on incoming radio transmissions, and to harvest energy from radio signals to energise the device 400.

The processing circuitry 420 comprises, for example, any one or more of: a master control unit (MCU); a microprocessor; a digital signal processor (DSP); an application specific integrated circuit (ASIC); a field programmable gate array; and a microcontroller. The device 400 further comprises an energy storage 430. In an example embodiment, the energy storage 430 comprises a rechargeable battery. In an example embodiment, the energy storage 430 comprises a capacitor.

In an example embodiment, at least part of harvested energy is stored into the energy storage 430.

When operating, the device 400 may use the harvested energy for backscattering while storing energy to the storage 430, or while not storing energy to the energy storage 430. As drawn in FIG. 4, the device 400 may comprise a controllable switch 450 that is controllable by the control circuitry to either connect or disconnect the memory 440 from the energy storage. In FIG. 4, potential power transfer connections are drawn by a double line. Notably, power may be transferred from the radio circuitry 410 to the memory whenever the radio circuitry 410 is capable of wirelessly harvesting energy with a sufficient voltage.

As mentioned, the AIoT device, such as a tag may radiate around some energy of the radio transmission in the backscattering. Moreover, the AIoT device may additionally or alternatively harvest some energy with the radio circuitry 410 from the radio transmission. Some of the harvested energy may be used simultaneously by various circuitries of the AIoT device while a remaining portion may be stored into the energy storage 430. In an example embodiment, the entire harvested energy is stored into the energy storage 430 before using. In an example embodiment, a two-stage range extension is provided for an AIoT device type B. A first stage provides for attempting to fully absorb/harvest energy by setting a small radio reflection coefficient $\alpha$ (close to zero) and storing harvested energy in the energy storage 430. This stored energy can later be used to power and operate a circuitry or circuitries of the AIoT device in a second stage, where backscattering is provided by setting a larger radio reflection coefficient $\alpha>>0$ or $\alpha\approx1$ and minimum energy to energise transmission can be used from the storage. This increased a will help increasing reflected power and range extension for type B backscattering devices.

In an example embodiment, a very small energy storage is required for the device of type B. This energy storage should be able to hold enough energy to operate the circuitry or circuitries of the AIoT device for a short period of time, such that backscattering can be performed by using relatively large radio reflection coefficient $\alpha$. It is understood that any excess stored energy may not be needed for the AIoT device as the AIoT device cannot use it to boost its transmission power anyway in absence of active transmission capability, such as amplification of radio signals.

In an example embodiment, the access point attempts to communicate with the AIoT device without any knowledge of a) an amount of energy stored in the energy storage of the AIoT device, b) a rate with which energy can be stored in the energy storage in the AIoT device, and c) an amount of remaining capacity of the energy storage. If the AIoT device is not successful to transfer information by backscattering such that the access point would detect the transfer of the information, the access point attempts to cause the AIoT device to begin to the first stage to wirelessly harvest energy to the storage. Then, the AIoT device begins to energise at least some of its circuitries by the energy stored in the energy storage and to communicate using backscattering with an increased radio reflection coefficient, as absorption of energy can be avoided or at least reduced. With the increased radio reflection coefficient, information transmitted by the AIoT device can be transferred more reliably to a receiver, such as the access point or a reader that is controlled by the access point.

The access point determines a duration of the first stage without such knowledge and then attempts communicating with the AIoT device again. On a failure of the AIoT device to transfer the information by the backscattering, the access point may attempt a longer or another duration and again attempt communicating until a set maximum time or number of attempts. In an example embodiment, the detecting of the transfer of the information by the backscattering comprise detecting whether an external reader has received the transferred information.

In an example embodiment, the access point is responsible for informing the AIoT device on dynamically setting its radio reflection coefficient $\alpha$ and AIoT device just follows instructions based on the signal it receives. In an example embodiment, the access point is any device connected to the network, e.g., a 3GPP device, including a gNB, a smartphone, etc. A monostatic configuration or a bistatic configuration may be used.

FIG. 5 shows a simplified signalling chart of an example embodiment to help explaining some example embodiments. In an example embodiment, the network apparatus is the illuminator, which is, for example, a 5G node B, gNB, or UE. Two AIoT device type B devices 110, 110' are shown in FIG. 5, as a first AIoT device 110 and a second AIoT device 110'. A procedure is mainly explained between the access point 120 and the second AIoT device 110'. It should be understood that the second device as well as any further devices may receive illumination signals and use those for absorbing and storing energy. FIG. 5 presents

501. Registering the AIoT devices with the network. The AIoT devices inform the network of their device type (e.g., type B in this case). In this way, the network gains knowledge about availability of an energy storage at the AIoT devices the operation with which is next described for some example embodiments. Notably, the network may in parallel co-operate with devices of other types. Here, the network includes any devices that operate with 3GPP, e.g., the gNB or the UE. Naturally, the registration information may be stored in a register, but capability information of the AIoT devices is available in the network.

502. The access point obtains capability information of the AIoT devices. In case that the registration was performed through the access point, the access point may simply obtain and maintain this knowledge. In an example embodiment, the access point is informed by the network of identifiers of the AIoT devices, and the access point obtains the capability information of the AIoT devices from a register. The access point may obtain the capability information by pulling or be provisioned with the capability information by the network.

503. On intending to enhance wireless charging of an AIoT device (or a set of AIoT devices), the access point sends an initial radio transmission, such as energy_harvest=0 to command the AIoT device(s) to attempt a normal backscattering mode. The normal backscattering mode means backscattering without a range extension process. Notice: if the illuminator is not co-hosted with the access point, the then access point may control the illuminator with commands or requests sent to the illuminator. In sake of simplicity, it is here assumed that the access point and the illuminator are co-hosted, or the access point can control the illuminator. In FIG. 5, both the first AIoT device 110 and a second AIoT devices 110' receive the radio transmission. Especially if the illuminator is not co-located with the access point, both the first AIoT device 110 and the second AIoT device 110' may even receive the radio transmission with same power level. However, they may and typically do reside at different distance or at least with a different radio signal attenuation because of different intermediate absorbing or reflecting objects so that their radio output is received differently by the access point, as is the case in this drawing.

504. The first AIoT device 110 normally backscatters information on receiving the initial radio transmission. This information is successfully communicated readable to the access point 120.

505. The second AIoT device 110' also normally backscatters information on receiving the initial radio transmission but due to poor wireless link the access point 120 does not receive the backscattered information 120. Hence, the access point 120 knows that the range of the second AIoT device 110' may not suffice. Notably, some AIoT devices may fail to receive the initial radio transmission sufficiently to even attempt backscattering information, in which case they would simply not backscatter anything. The access point 120 may detect that it has not received backscattering signal for a predetermined time period. Based on that, the access point 120 may determine that backscattering by device 110' has failed, or that the device has performed the backscattering, but the range is not long enough. Alternatively, if another access point is communicating with the device, an indication may be received from that another access point that no backscattering has been received from the device 110'.

506. The transmission of the initial radio transmission and attempting to read responsive backscattering signals is performed k times, wherein k is a finite integer, such as 1, 2, 3, 4, 5, 6, 7, 8, 9, or 10. The value of k may be greater than 1, or greater than 5, for example. With k greater than 1, temporary radio path problems may be overcome.

507. A range extension process is started. Notably, the access point 120 lacks knowledge of internal power requirements (e.g., for processing) of the AIoT devices 110, 110', of their radio attenuation with regard to a source of energising radio signals (the source being, e.g., the access point itself, or an illuminator) and to the access point, capacities of their energy storages, etc., Hence, the access point 120 cannot predetermine how long time it will take before each of the AIoT devices can backscatter with a greater radio reflection coefficient. In an example embodiment, the range extension process comprises a charging phase and a communication phase after the charging phase. In an example embodiment, the access point 120 uses a counter to control the incremental boost procedure. There the access point 120 sets an initial value of a counter N for the illuminator to send energy signals N−1 times to be followed by a backscattering signal sent by the AIoT device (here by the second AIoT device 110').

508. In beginning of the charging phase, the access point 120 sends a first radio transmission to the AIoT devices or particularly to the second AIoT device 110'. The first radio transmission comprises instructions, such as a signal energy_harvest=1, to the AIoT devices concerned not to backscatter but rather to absorb (at least mostly) energy from the energising radio transmission and store the absorbed energy for later use. In an example embodiment, the access point sends an indication of intended AIoT device(s) target for these instructions, such as an ID_list to let a group of AIoT devices know that the energising radio transmission is available for harvesting energy to the energy storage. Note that the intended AIoT device (as well as possible other AIoT devices not intended to participate in this incremental energy boost) does not perform any backscattering in this step so there is no transmission by the backscattering by the AIoT device in question.

509. The first AIoT device 110 is energised or illuminated by a radio transmission or radio transmissions by the access point or network apparatus 120, or by another network device. These radio transmissions may be referred to as energising radio transmissions. The energising radio transmissions are provided to enable the AIoT device to wirelessly harvest energy to its energy storage. As the energising radio transmission or transmissions continue for the duration of energy harvesting, a wide arrow is drawn.

510. The second AIoT device 110' decreases its radio reflection coefficient to zero or close to zero so as to harvest energy to its energy storage for operation of circuits of the AIoT device later without need or with reduced need to consume power of the energising radio transmission when the AIoT device is expected to backscatter information to the network. The AIoT device 110' may harvest energy from radio transmission or radio transmissions received from the access point 120.

511. If N>2, steps 508 to 510 are repeated N−1 times before next step.

512. The access point repeats step 503 for the second AIoT device 110', i.e., the access point sends the initial radio transmission with energy_harvest=0 again.

513. On receiving the initial radio transmission, the second AIoT device 110' uses its stored energy to operate one or more of its circuitries, such as a processing circuitry. This reduces required power draw from the received energising signal. The second AIoT device 110' sets a higher value of radio reflection coefficient $0<<\alpha<1$ for backscattering without loss of operability, such as 1 or as close to 1 as possible with the second AIoT device 110'. If there is a sufficiently amount of energy in the energy storage of the second AIoT device 110' to operate its circuitries (or in an example embodiment, at least some of the circuitries), the second AIoT device 110' can use maximum possible value of $\alpha$ to allow more reflection, thereby increasing its reflected power. In an example embodiment, if the stored energy is insufficient to operate the circuit, the second AIoT device 110' uses an intermediate value of α with which the second AIoT device 110' can harvest sufficiently energy to energise the circuit and while using remaining radio reflectivity for backscattering.

514. Backscattering by the AIoT device with the increased radio reflection coefficient.

515. If the access point 120 fails to receive the backscattered information from the AIoT device, the access point 120 increases the value of N and resumes to step 508, if N<N_max, wherein N_max represents a termination condition to avoid too long or infinite loops.

516. If the access point 120 is able to receive backscattering information, the communication phase follows, and in an example embodiment, next initialisation step 507 is adapted based on the last value of N with which the reception of information from the AIoT device was successful.

517. The process ends for this time to be repeated when the access point 120 should next time communicate with a proximate AIoT device that should reside in the range of the access point 120.

Figure 6:
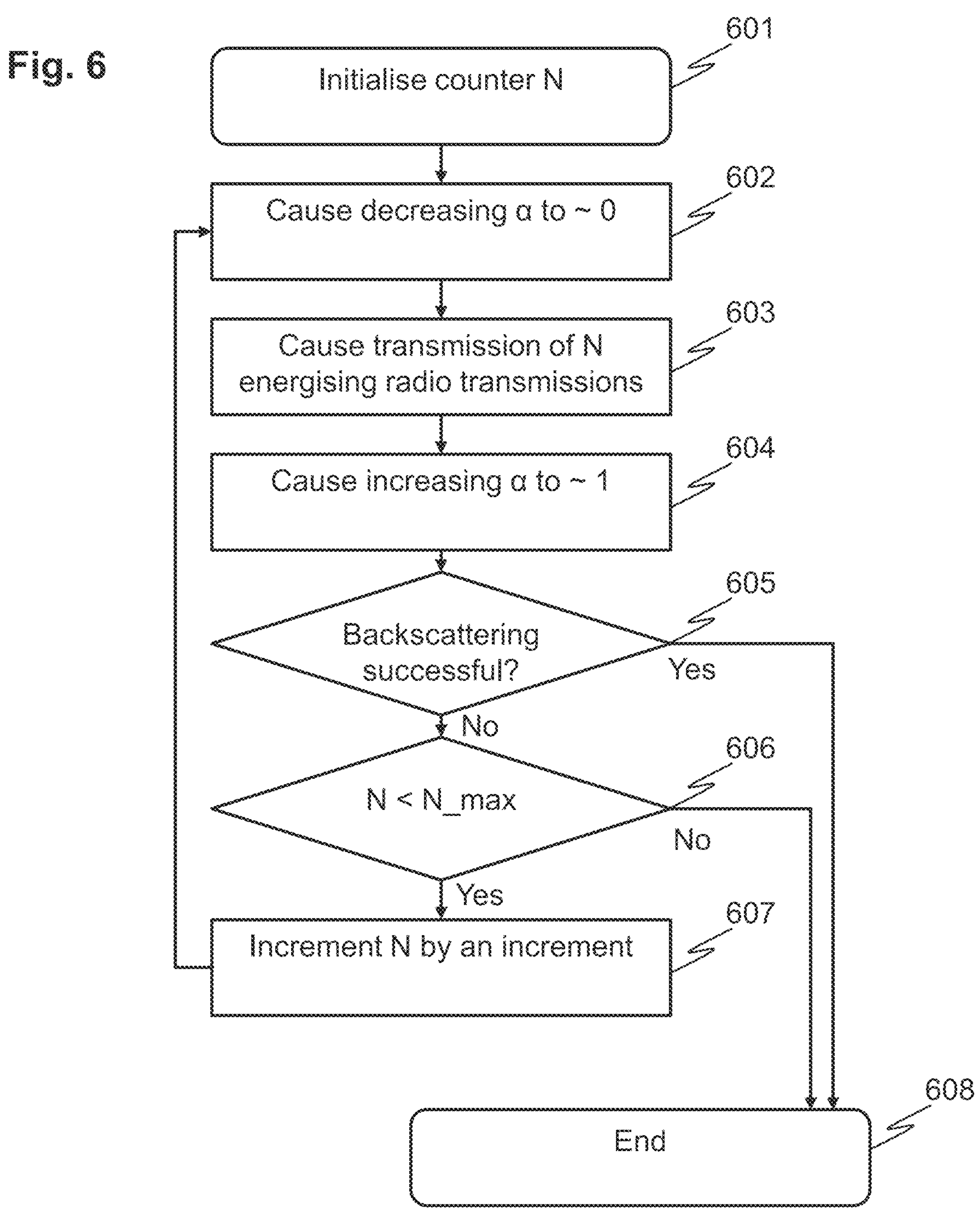
FIG. 6 shows a simplified flow chart of a process of an example embodiment.

FIG. 6 shows a simplified flow chart of a method an example embodiment. The method of FIG. 6 may be used, for example, in conjunction with some example embodiments disclosed with reference to FIG. 5. FIG. 5 may be performed by the access point 120, such as the gNB that is assumed to be a joint illuminator/access point. In an example embodiment, the method comprises a charging phase in which the AIoT device 110 charges its energy storage as commanded by the access point 120, until instructed by the access point 120 to enhance radio reflectivity for enhanced backscattering in a subsequent communication phase.

In step 601, the access point initialises the aforementioned counter N. In an example embodiment, the initialisation is performed always by setting N to a constant initial value. In an alternative example embodiment, the initialisation comprises setting a different initialisation value on a subsequent run. In an example embodiment, the different initialisation value is the last successful value of N, so as to accelerate reaching a success with the range extension process. In an example embodiment, the different initialisation value is an intermediate value chosen between 1 and the last successful value of N. In an example embodiment, the intermediate value is an average of 1 and the last successful value of N, when rounded up or down. In an example embodiment, the different initialisation value is that of the last successful value of N until a given portion of attempts succeed on a first attempt, and then a smaller initialisation value is used. In an example embodiment, the smaller initialisation value is the aforementioned average. In an example embodiment, the smaller initialisation value is a portion of the last successful value of N. In an example embodiment, the portion is at most 80% or 90% of N. In an example embodiment, the portion is at least 50% or 70% of N.

In step 602, the access point causes transmission of the signal 508 to command the energised AIoT device or devices to decrease their radio reflection coefficients as close to zero as possible and to harvest more energy to their own energy storage.

In step 603, the access point causes transmission of N energising radio transmissions for harvesting by the AIoT device or devices in a state in which no backscattering is expected. In an example embodiment, instead of specifically causing transmission of N energising radio transmissions, a corresponding pause of N durations can be made to allow the AIoT device to harvest energy from energising radio signals. Such energising radio signals are sent in an example embodiment independently of the access point.

In an example embodiment, there is no gap between the N energising radio transmission so that a single radio transmission can be seen made the duration of N time periods. The duration in which the energising radio transmission(s) is (are) made may be referred to a harvesting period. In the present document, an energising radio transmission is used interchangeably with a radio transmission that continues for a given duration regardless of whether there is a gap or break between consecutive radio transmissions. By providing the AIoT device or devices with the N energising radio transmission, the energised AIoT device or devices may gain a dynamically modifiable and generally incrementing dose of energy so as to harvest sufficient energy for extending their range using stored energy to power at least some circuitries and so enable use of increased radio reflection coefficient as described in the foregoing.

In FIG. 6, it is the access point that controls the duration of the energy harvesting so the AIoT devices need not be informed of that how many energising radio transmissions will be provided. Instead, in step 604 the access point sends a command to the AIoT to increase the radio reflection coefficient as close to 1 for improving likelihood of successfully backscattering information to the access point.

In 605, the access point checks whether information was successfully backscattered by the AIoT device or devices. If yes, the process goes to end 608. Otherwise, the process continues in step 606.

In step 606, the access point verifies whether N has not met a termination condition, e.g., whether N is smaller than maximum value of N, N_max. If the termination condition is not yet met, the process continues in step 607, otherwise the AIoT device or devices from which no backscattering is successfully received, is or are deemed to be out of coverage and the process goes to end 608. In an example embodiment, the steps 605 and 606 are combined. This is mentioned as an example of room for variations without intending to exclude other variations available to persons ordinarily skilled in the art.

In step 607, the access point increments N by an increment delta. In an example embodiment, the increment is a constant, such as 1. In an example embodiment, the increment is variable, such as a portion of N or a N times a factor x, wherein x is greater than 0 and possibly greater than 1. The process then resumes to step 602.

FIGS. 7*a* and 7*b* show a flow chart exemplifying a process of an example embodiment in an apparatus, such as a network apparatus or an access point, or in a controller of the apparatus, the process comprising

701. Causing sending an initial transmission to a device, wherein the device is an ambient internet of things device with an energy storage and wherein the device is capable of transmitting data by backscattering a radio transmission. In an example embodiment, the causing of the sending of the initial transmission comprises instructing an internal access point to perform the sending of the initial transmission. In an example embodiment, the causing of the communication comprises instructing an external access point to perform the sending of the initial transmission. In an example embodiment, the caused sending of the initial transmission is performed by a radio communication suitable for the ambient internet of things device.

702. Causing detecting that the device has failed to transfer data by the backscattering.

703. Based on the detecting, cause sending, to the device, a first radio transmission comprising instructions to decrease a radio reflection coefficient to increase wireless energy harvesting. In an example embodiment, the first radio transmission is sent by an internal access point. In an example embodiment, the first radio transmission is sent by an external access point. In an example embodiment, the first radio transmission is suitable for the ambient internet of things device.

704. Causing sending to the device a second radio transmission comprising instructions to increase the radio reflection coefficient to decrease wireless energy harvesting. In an example embodiment, the second radio transmission is sent by an internal access point. In an example embodiment, the second radio transmission is sent by an external access point. In an example embodiment, the second radio transmission is suitable for the ambient internet of things device.

705. Causing attempting to detect that the device has succeeded to transfer data by the backscattering.

Detecting that the device has failed to transfer data by the backscattering is to be understood so that the device might have transmitted the data but the reader device has not succeeded to receive the data, e.g. due to inefficient backscattering. Thus, the data is not actually transferred from the device to the reader.

The process may be performed or caused by a controller of the apparatus. In an example embodiment, the controller comprises at least one processor. In an example embodiment, the controller comprises at least one memory. In an example embodiment, the apparatus is a 5G node B, gNB. In an example embodiment, the apparatus comprises a network interface configured to communicate with a cellular network and to receive a device communication request from the cellular network. In an example embodiment, the controller is further configured to detect the device communication request, and to responsively cause the first attempt of communicating with the device by the proximity communication circuitry. In an example embodiment, the apparatus is a UE.

The process may further comprise any one or more of the following:

706. Repeating the causing of the sending of the first radio transmission comprising instructions to decrease the radio reflection coefficient and the sending of the second radio transmission comprising instructions to increase the radio reflection coefficient until detecting that the device has succeeded to transfer data by the backscattering or until detecting that a maximum number of repetitions has been performed.

707. The detecting that the device has succeeded to transfer data by the backscattering comprising detecting reception of data from the device after sending a radio transmission to the device.

708. The detecting that the device has succeeded to transfer data by the backscattering comprising receiving information from an ambient internet of things access point that the ambient internet of things access point has succeeded to receive data from the device after the apparatus has sent a radio transmission to the device. The ambient internet of things access point may be operable independently of the apparatus that performs step 701.

709. Determining, after detecting that the device has succeeded to transfer data by the backscattering, for a subsequent communication attempt with the device, instructions to decrease the radio reflection coefficient factor to increase wireless energy harvesting based on previous instructions.

710. The detecting that the device has failed to transfer data by the backscattering comprising detecting 710. a failure of receiving data from the device during the sending of the initial radio transmission to the device.

711. The detecting that the device has failed to transfer data by the backscattering comprising receiving information from an ambient internet of things access point that the ambient internet of things access point has failed to receive data from the device during the sending of the radio transmission to the device. The ambient internet of things access point may be operable independently of the apparatus that performs step 701.

712. Causing transmitting to the device an energising radio transmission intended for energy harvesting with a decreased or low radio reflection coefficient after the sending of the first radio transmission comprising the instructions to decrease the radio reflection coefficient.

713. The energising radio transmission intended for energy harvesting with the decreased or low radio reflection coefficient being one continuous transmission. In an example embodiment, the energising radio transmission intended for energy harvesting with the decreased or low radio reflection coefficient are transmitted as a plurality of discontinuous transmissions.

In an example embodiment, the process further comprises synchronising the first attempt with discontinuous wireless energising of the device. In an example embodiment, the process further comprises, in the repeating of the causing of the sending of the first radio transmission and of the second radio transmission, waiting for a harvesting duration between the first a second radio transmissions. In an example embodiment, the process further comprises extending the harvesting duration by a varying extension, such as a progressive extension. In an example embodiment, the process further comprises extending the harvesting duration by a fixed duration or maintained unchanged. In an example embodiment, the extending of the harvesting duration is independent of the device, i.e., same for all devices.

In an example embodiment, the process further comprises performing an initialising before attempting to communicate with the ambient internet of things device for a first time. In an example embodiment, the initialising comprises setting the harvesting duration to a minimum duration. In an example embodiment, the initialising comprises setting the harvesting duration to the latest harvesting duration with which communication with the device has succeeded. In an example embodiment, the initialising comprises setting the harvesting duration to an intermediate duration that is between the minimum duration and the latest harvesting duration with which communication with the device has succeeded. In an example embodiment, the intermediate duration is an average of the minimum duration and the latest harvesting duration with which communication with the device has succeeded. In an example embodiment, the intermediate duration is a sum of the minimum duration and the latest harvesting duration with which communication with the device has succeeded, multiplied by at least: 0.25; 0.3; 0.35; 0.4; or 0.45.

In an example embodiment, the process further comprises specifically directing one or more communications to the device using at least an identifier of the device. In an example embodiment, the energy harvesting is increased from a zero level. That is, in some cases, e.g., because of hardware or positioning of the AIoT device, or both, there may be no energy harvesting present before increasing the energy harvesting with the increase of the radio reflection coefficient. In an example embodiment, the energy harvesting is increased from a level greater than zero.

In an example embodiment, the extension of the harvesting duration is defined specifically for the device. In an example embodiment, the properties of the device are learned and used to customised energising of the device.

In an example embodiment, the process further comprises receiving a device communication request from a cellular network. In an example embodiment, the process further comprises detecting the device communication request, and responsively causing the first attempt of communicating with the ambient internet of things device.

In an example embodiment, the reduced radio reflection coefficient is as small as possible, e.g., at most 0.5%, 1% or 5%.

In an example embodiment, the increased radio reflection coefficient is as great as possible, e.g., at least 95%, 99%, or 99.5%.

FIG. 8 shows a flow chart exemplifying a process of an example embodiment in a device, such as an ambient internet of things device, such as the device 400 of FIG. 4, the process comprising

801. Receiving an initial radio transmission and causing an attempt to transfer data to the apparatus by backscattering the initial radio transmission.

802. Receiving a first radio transmission comprising instructions to decrease a radio reflection coefficient to increase wireless energy harvesting.

803. Decreasing the radio reflection coefficient according to the received instructions to increase wireless energy harvesting to an energy storage of the device.

804. Receiving a second radio transmission comprising instructions to increase the radio reflection coefficient to decrease wireless energy harvesting.

805. Increasing the radio reflection coefficient according to the received instructions and backscatter outgoing data with the increased radio reflection coefficient.

The process may further comprise any one or more of the following:

806. Detecting an insufficient amount of energy in the energy storage for continued operation with the increased radio reflection coefficient.

807. Responsively to the detecting that there is the insufficient amount of energy for continued operation with the increased radio reflection coefficient, causing setting the radio reflection coefficient to an intermediate value below the increased radio reflection coefficient and above that for the temporarily decreasing of the radio reflection coefficient.

808. Causing an attempt to transfer data to the apparatus by the backscattering, before receiving the first radio transmission comprising instructions to decrease the radio reflection coefficient to increase wireless energy harvesting.

As used in this application, the term "circuitry" may refer to one or more or all of the following:

(a) hardware-only circuit implementations (such as implementations in only analogue and/or digital circuitry) and;

(b) combinations of hardware circuits and software, such as (as applicable):

(i) a combination of analogue and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Without in any way limiting the scope, interpretation, or application of the claims appearing below, a technical effect of one or more of the example embodiments disclosed herein is that range of ambient internet of things devices may be increased. Another technical effect of one or more of the example embodiments disclosed herein is that the range of the ambient internet of things devices may be increased using local energy storage only where necessary so avoiding unnecessary delays when the ambient internet of things devices are readily capable of communicating by backscattering an energising radio transmission. Yet another technical effect of one or more of the example embodiments disclosed herein is that increasing the range of the ambient internet of things devices through increased radio reflection coefficient avoids a need to increase radio power of the energising radio transmission, so avoiding increase of radio interference and energy consumption. Still further technical effect of one or more of the example embodiments disclosed herein is that very little resources are needed to for the increase of the range, and overall energy efficiency may be enhanced.

Embodiments may be implemented in software, hardware, application logic or a combination of software, hardware, and application logic. The software, application logic and/or hardware may reside on the network apparatus, on a controller of the network apparatus, on the AIoT device, or on the control circuitry of the AIoT device. If desired, part of the software, application logic and/or hardware may reside on the network apparatus, part of the software, application logic and/or hardware may reside on the AIoT device, and part of the software, application logic and/or hardware may reside on an external access point or illuminator. In an example embodiment, the application logic, software, or an instruction set is maintained on any one of various conventional computer-readable media. In the context of this document, a "computer-readable medium" may be any non-transitory media or means that can contain, store, communicate, propagate, or transport the instructions for use by or in connection with an instruction execution system, apparatus, or device, such as a computer, with one example of a computer described and depicted in FIG. 3 or 4. A computer-readable medium may comprise a computer-readable storage medium that may be any media or means that can contain or store the instructions for use by or in connection with an instruction execution system, apparatus, or device, such as a computer. The term non-transitory as used herein is a limitation of the medium itself (i.e., tangible, not a signal) as opposed to a limitation on data storage persistency (e.g., random access memory vs. read only memory).

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope as defined in the appended claims.

The invention claimed is:

1. A device, wherein the device is an ambient internet of things device comprising:

an energy storage, at least one processor; and at least one memory storing instructions that, when executed by the at least one processor, cause the device to:

receive an initial radio transmission and cause an attempt to transfer data to an apparatus by backscattering the initial radio transmission;

receive a first radio transmission comprising instructions to decrease a radio reflection coefficient to increase wireless energy harvesting;

decrease the radio reflection coefficient according to the received instructions to increase wireless energy harvesting to the energy storage;

receive a second radio transmission comprising instructions to increase the radio reflection coefficient to decrease wireless energy harvesting; and increase the radio reflection coefficient according to the received instructions and backscatter outgoing data with the increased radio reflection coefficient;

detect an insufficient amount of energy in the energy storage for continued operation with the increased radio reflection coefficient; and responsively cause setting the radio reflection coefficient to an intermediate value below the increased radio reflection coefficient and above that for the temporarily decreasing of the radio reflection coefficient.

2. A method, comprising:

by a device that is an ambient internet of things device, receiving an initial radio transmission and causing an attempt to transfer data to an apparatus by backscattering the initial radio transmission;

receiving, by the device, a first radio transmission comprising instructions to decrease a radio reflection coefficient to increase wireless energy harvesting;

decreasing, by the device, the radio reflection coefficient according to the received instructions to increase wireless energy harvesting to an energy storage of the device;

receiving, by the device, a second radio transmission comprising instructions to increase the radio reflection coefficient to decrease wireless energy harvesting;

increasing, by the device, the radio reflection coefficient according to the received instructions and backscattering, by the device, outgoing data with the increased radio reflection coefficient;

detecting an insufficient amount of energy in the energy storage for continued operation with the increased radio reflection coefficient; and responsively causing setting the radio reflection coefficient to an intermediate value below the increased radio reflection coefficient and above that for the temporarily decreasing of the radio reflection coefficient.

* * * * *